United States Patent
Smith et al.

(10) Patent No.: US 12,254,597 B2
(45) Date of Patent: Mar. 18, 2025

(54) SEMANTIC-AWARE INITIAL LATENT CODE SELECTION FOR TEXT-GUIDED IMAGE EDITING AND GENERATION

(71) Applicant: Adobe Inc., San Jose, CA (US)

(72) Inventors: Cameron Smith, San Jose, CA (US); Wei-An Lin, San Jose, CA (US); Timothy M. Converse, San Francisco, CA (US); Shabnam Ghadar, San Jose, CA (US); Ratheesh Kalarot, San Jose, CA (US); John Nack, San Jose, CA (US); Jingwan Lu, Santa Clara, CA (US); Hui Qu, Santa Clara, CA (US); Elya Shechtman, Seattle, WA (US); Baldo Faieta, San Jose, CA (US)

(73) Assignee: Adobe Inc., San Jose, CA (US)

( * ) Notice: Subject to any disclaimer, the term of this patent is extended or adjusted under 35 U.S.C. 154(b) by 464 days.

(21) Appl. No.: 17/709,221

(22) Filed: Mar. 30, 2022

(65) Prior Publication Data
US 2023/0316475 A1 Oct. 5, 2023

(51) Int. Cl.
*G06T 5/50* (2006.01)
*G06N 3/045* (2023.01)

(52) U.S. Cl.
CPC .......... *G06T 5/50* (2013.01); *G06N 3/045* (2023.01); *G06T 2207/20081* (2013.01); *G06T 2207/20084* (2013.01); *G06T 2207/20221* (2013.01)

(58) Field of Classification Search
CPC ............. G06T 5/50; G06T 2207/20081; G06T 2207/20084; G06T 2207/20221; G06T 11/60; G06T 2200/24; G06N 3/045; G06N 3/0475; G06N 3/08
See application file for complete search history.

(56) References Cited

U.S. PATENT DOCUMENTS

| 2022/0122308 A1* | 4/2022 | Kalarot | G06T 11/60 |
| 2023/0022550 A1* | 1/2023 | Guo | G06T 11/60 |
| 2023/0153606 A1* | 5/2023 | Min | G06N 3/08 |
| | | | 706/25 |

(Continued)

OTHER PUBLICATIONS

Patashnik, OR, et al., "StyleCLIP: Text-Driven Manipulation of StyleGAN Imagery", , https://arxiv.org/abs/2103.17249, arZXiv:2103.17249v1,, Mar. 31, 2021, pp. 1-18.

*Primary Examiner* — Aaron W Carter
(74) *Attorney, Agent, or Firm* — Kilpatrick Townsend & Stockton LLP

(57) ABSTRACT

An item recommendation system receives a set of recommendable items and a request to select, from the set of recommendable items, a contrast group. The item recommendation system selects a contrast group from the set of recommendable items by applying a image modification model to the set of recommendable items. The image modification model includes an item selection model configured to determine an unbiased conversion rate for each item of the set of recommendable items and select a recommended item from the set of recommendable items having a greatest unbiased conversion rate. The image modification model includes a contrast group selection model configured to select, for the recommended item, a contrast group comprising the recommended item and one or more contrast items. The item recommendation system transmits the contrast group responsive to the request.

20 Claims, 8 Drawing Sheets

(56) References Cited

U.S. PATENT DOCUMENTS

| | | | |
|---|---|---|---|
| 2023/0230198 A1* | 7/2023 | Zhang | G06N 3/047 |
| | | | 382/276 |
| 2023/0316475 A1* | 10/2023 | Smith | G06T 11/60 |
| 2024/0095534 A1* | 3/2024 | Anandkumar | G06N 3/08 |
| 2024/0104275 A1* | 3/2024 | Liu | G06F 30/27 |
| 2024/0112403 A1* | 4/2024 | Olson | G06N 3/08 |
| 2024/0135610 A1* | 4/2024 | Kolkin | G06T 11/60 |
| 2024/0144651 A1* | 5/2024 | Bulat | G06V 10/776 |
| 2024/0161462 A1* | 5/2024 | Gandelsman | G06T 5/60 |
| 2024/0256597 A1* | 8/2024 | Zhang | G06F 40/40 |
| 2024/0273798 A1* | 8/2024 | Oh | G06T 15/04 |

* cited by examiner

SEMANTIC-AWARE INITIAL LATENT CODE SELECTION FOR TEXT-GUIDED IMAGE EDITING AND GENERATION

TECHNICAL FIELD

This disclosure generally relates to machine learning techniques for image morphing processes. More specifically, but not by way of limitation, this disclosure relates to machine learning models for a semantic-aware image morphing process.

BACKGROUND

Conventional image editing systems may use image manipulation models to morph or otherwise transform images.

SUMMARY

The present disclosure describes techniques for using an image modification system to generate a blended image. The image modification system receives an input text and a request for a blended image and generates the blended image by applying an image modification model to an input image and the input text. The image modification system selects an initial latent code based on an input text contrastive language-image pre-training ("CLIP") code determined based on the input text. The image modification system blends the initial latent code with an input image latent code determined for the input image to generate a blended image latent code and generates the blended image from the blended image latent code. The image modification system transmits, responsive to the request, the blended image.

Various embodiments are described herein, including methods, systems, non-transitory computer-readable storage media storing programs, code, or instructions executable by one or more processing devices, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
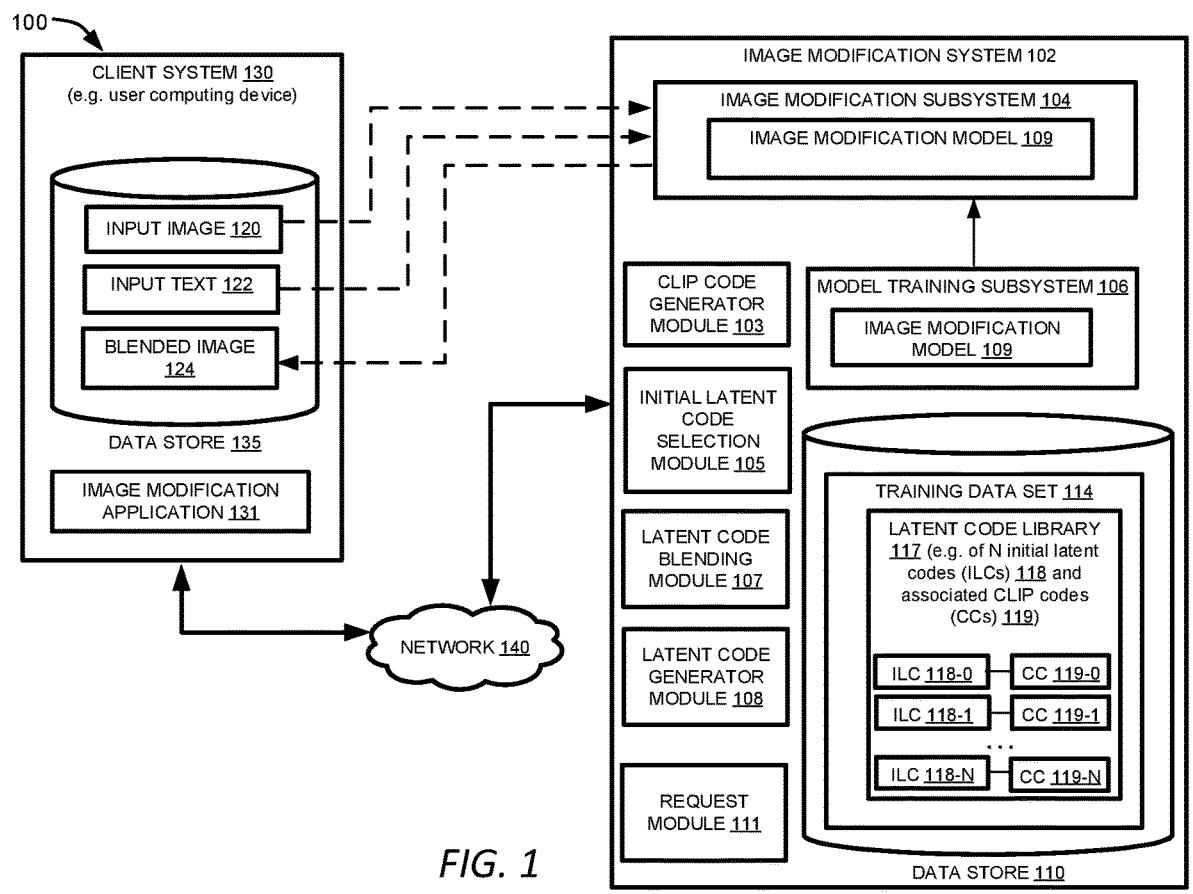
FIG. 1 depicts an example of a computing environment for generating a blended image by modifying an input image using an image modification model that is guided by an input text, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Certain embodiments described herein address the limitations of conventional image editing systems by providing a machine learning model to perform morphing operations on an input image to generate a morphed image, wherein the morphed image can be used for modifying online computing environments or other systems. An image editing system is typically a network-based computing system including network-connected servers configured to offer a service (e.g. via a website, mobile application, or other means) allowing end users (e.g., consumers) to interact with the servers using network-connected computing devices (e.g. personal computers and mobile devices) to select or otherwise provide an input image and instructions for editing the input image. For example, the instructions include an input text that specifies target characteristics toward which to morph the input image into a blended image.

Conventional image editing systems may train a neural network to begin an image optimization process from a mean latent code or other predefined latent code representing a generic image comprising a set of characteristics and perform an iterative morphing process to blend the predefined initial latent code with a latent code of the input image to generate a blended image that is semantically similar to the text input. However, in practice, utilizing such a predefined initial latent code may bias the morphing process so that the image morphing process is inaccurate with regard to images having characteristics that do not resemble the predefined latent code. Therefore, the output images of such a conventional text-guided image manipulation model may not be visually realistic and also may result in controversial racial or gender inaccuracies as well as exclusion of applicability of image morphing processes to particular types of images. For example, a predefined initial latent code that corresponds to an image of a white woman may generate an inaccurate output image if the input image is of a man or of a non-white person. Further, while the use of a predefined initial latent code in conventional text-guided image manipulation models may, in some cases, provide accurate results, a number of iterations of a morphing operation required to reach target characteristics specified by an input text may increase as a similarity between the predefined initial latent code and the target characteristics decreases, resulting in increased bandwidth usage by conventional image editing systems. Certain embodiments described herein improve the performance of conventional image manipulation models used in image editing systems by, for example, selecting, from a cache of initial latent codes, an initial latent code that corresponding to characteristics specified in the input text, which can improve an accuracy of an image output by the text-guided image manipulation model and which can reduce a number of iterations of the image manipulation model necessary to generate the output image.

The following non-limiting example is provided to introduce certain embodiments. In this example, an image modification system that implements an image modification model receives an input image (e.g. an image of a young man) as well as an input text that specifies target features for performing an image modification process on the input image (e.g. an input text that says "Santa Claus"). The input image and the input text may be received from a client system (e.g. an image blending service system). The image modification system generates a blended image. For example, the image modification system generates a blended image that resembles the input image (the image of the young man) as well as target features specified in the input text (features of Santa Claus) by applying the image modification model to the input image and the input text. The image modification system selects an initial latent code, based on the input text, from a set of initial latent codes. For example, the initial latent code could be associated with an image of Santa Claus, which was specified in the input text. The image modification system generates a blended latent code by blending the initial latent code with a latent code determined from the input image. The image modification system generates a blended image from the blended latent code.

Continuing with this example, the image modification system transmits the blended image (output by the image modification model) to the system from which the request for the blended image was received. In this example, the system that requested the blended image is an image blending service system. In some embodiments, the image blending service system, or the system to which the blended image is transmitted, modifies features of an online computing environment based on the blended image. In some instances, modifying the features of the online computing environment include presenting the blended image to a user accessing the image blending service system via a user computing device (e.g. via an application or web browser operating on the user computing device), or otherwise performing an action with respect to the user request for the blended image.

In certain embodiments, during a training phase, the image modification model is trained to generate a blended image based on an input image and an input text. In an example, an initial latent code library is constructed from a set of images. The latent code library includes a set of initial latent codes, each of which can be used in a latent code blending process. For example, to construct the latent code library, the image modification system 102 generates, using a CLIP model, a CLIP code for each of the set of images and, using latent code encoder, an initial latent code for each of the set of images. The image modification model is trained using one or more loss functions during the training phase. For example, a CLIP loss is a loss between an input text CLIP code and a CLIP code determined from a blended image output by the image modification model. At each iteration of the image modification model, one or more parameters of the image modification model may be modified based on the determined CLIP loss. For example, the CLIP loss represents how text features derived from a blended image output by the image modification model correspond to features specified in the input text. Other loss functions may also be used. For example, an identity loss or perceptual loss can represent how features in the blended image output by the image modification model corresponds to features of the input image. For example, a face recognition network can compare features between the blended image and the input image and determine the identity loss. In some examples, the image modification model is trained using a combined loss function determined from one or more loss functions (e.g. a combined loss function based on the CLIP loss function and the identity loss function).

The image modification model that generates a blended image based on an input image and an input text, described herein, provides several improvements and benefits over conventional techniques. For example, the conventional techniques discussed above use, in conjunction with an image blending process, a predefined initial latent code with which to blend an input image latent code determined from the input image. The image modification model described herein can reduce a number of iterations of the image modification model necessary to generate a blended image having features corresponding to features identified in the input text. Therefore, the blended image output provided by the image modification model described herein decrease a usage of computing resources and increase a speed at which an output blended image is generated. Further, the image modification model described herein can increase an accuracy of output blended image with respect to target features specified in the input text through selection of an initial latent code for the image blending process that is semantically similar to the target features specified in the input text.

As used herein, the term "CLIP code" is used to refer to an output of a Contrastive Language-Image Pretraining ("CLIP") model that is trained on a variety of image-text pairs. Accordingly, the CLIP model can generate a CLIP code for an input image. In certain examples, the image modification model can access a latent code library that includes a set of starting latent codes, each of the starting latent codes associated with a respective clip code which is an output of a CLIP model applied to a respective image generated from the respective starting latent code. In certain examples, an input text CLIP code can be generated from an input text by applying a CLIP model to the input text. In these examples, the CLIP model generates an input text CLIP code that is similar to a format and content to CLIP codes generated when the CLIP model is applied to images. For example, the input text could be "A young boy with blonde hair" and the input text CLIP code could be a matrix or array [B, 512] of B rows and 512 columns, for all text inputs, where B (rows) is the number of text inputs in each batch. In certain examples, an input text CLIP code is compared against a set of CLIP codes in the latent code library to select a CLIP code that has a greatest similarity to the input text CLIP code. In certain examples, the image modification system determines a CLIP loss based on the input text CLIP code and a blended image CLIP code determined from a blended image output by the image modification model.

As used herein, the term "latent code" is used to refer to a vector representation of an image in a latent space (e.g. a StyleGAN space or other latent space). In certain examples, a latent code is a vector (e.g. an 18×512 vector) that represents an image. In certain examples, the latent code includes a set of vectors for a set of layers (e.g. scales). For example, the set of vectors comprises 18 layer-specific 1×512 vectors. For example, in the context of a facial image, higher layers may represent course features (e.g. pose and hairstyle), and lower layers may represent features such as color scheme and details. In certain examples, the latent code is a low-dimensional representation of an image that when, passed through a generative adversarial network (e.g. a StyleGAN network), outputs the image. In certain examples, a latent code is generated from an image by applying a latent code encoder (e.g. a StyleGAN encoder or other encoder) to the image. The latent code encoder can also generate an image from a latent code. In certain examples, an initial latent code is selected from a set of initial latent codes based on similarity of CLIP codes associated with each of the set of latent codes to a CLIP code generated from the input text. For example, the image modification system stores a set of initial latent codes, each of the set of initial latent codes associated with a respective CLIP code. In certain examples, a blended latent code is generated by mixing the selected initial latent code with the input image latent code. A blended image can be generated from the blended latent code.

Example Operating Environment for Determining a Contrast Group from a Set of Recommendable Items Referring now to the drawings, FIG. 1 depicts an example of a computing environment 100 for generating a blended image by modifying an input image using an image modification model that is guided by an input text. The computing environment 100 includes an image modification system 102, which can include one or more processing devices that execute an image modification subsystem 104 and a model training subsystem 106. In certain embodiments, the computing environment 100 includes a contrastive language-image pre-training ("CLIP") module 103, an initial latent code selection module 105, a latent code blending module 107, a latent code generator module 108, and a request module 111.

In certain embodiments, the image modification system 102 is a network server or other computing device connected to a network 140. The image modification system 102 applies an image modification model 109 to an input image 120 and an input text 122 received from a client system 130 to generate a blended image 124. For example, applying the image modification model 109 includes selecting, from a latent code library 117, a starting latent code 118 from a set of starting latent codes 118. Each of the set of starting latent codes 118 has a respective associated CLIP code 119 and the selected starting latent code 118 has an associated CLIP code 119 that has a greatest similarity to a CLIP code 119 determined from the input text 122. The one or more processing devices of the image modification system 102 can further execute a model training subsystem 106 for training the image modification model 109 that is used for generating the blended image 124. The item recommendation system 102 transmits the blended image to the client system 130 via the network 140 and the client system 130 stores the blended image 124 in the data store 135. The computing environment 100 further includes a data store 110 for storing data used in the generation of the blended image 125, such as the training data set 114, which includes the latent code library 117.

In certain examples, the item recommendation system 102 generates the latent code library 117 from a set of training images and includes, for each of the set of images, a set of N initial latent codes ("ILCs") 118 (e.g. ILC 118-0, ILC 118-1, ... ILC 118-N), where each of the set of initial latent codes 118 is associated with a respective CLIP code ("CC") of a set of CCs 119 (e.g. CC 119-0, CC 119-1, ... CC 119-N). For example, ILC 118-0 is associated with CC 119-0, ILC 118-1 is associated with CC 119-1, etc. In certain embodiments, the set of ILCs 118 is generated by applying an encoder to each of the set of images and the set of CCs 119 is generated by applying a CLIP model to each of the set of images. For example, ILC 118-0 is generated by applying an encoder to an image and CC 119-0 is associated with the ILC 118-0 is generated by applying a CLIP model to the image. In certain embodiments, the latent code generator module 108 applies the encoder to the set of images to generate the CCs 119 and the CLIP module 103 accesses the CLIP model and applies the CLIP model to each of the set of images to generate the ILCs 118.

The image modification subsystem 104, the model training subsystem 106, the CLIP module 103, the initial latent code selection module 105, the latent code blending module 107, the latent code generator module 108, and the request module 111 may be implemented using software (e.g., code, instructions, program) executed by one or more processing devices (e.g., processors, cores), hardware, or combinations thereof. The software may be stored on a non-transitory storage medium (e.g., on a memory component). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the image modification system 102 can be implemented using more or fewer systems or subsystems than those shown in FIG. 1, may combine two or more subsystems, or may have a different configuration or arrangement of the systems or subsystems.

The image modification subsystem 104 is configured to receive or otherwise access an input image 120 and an input text 122. In certain embodiments, the request module 111 receives or accesses the input image 120 and the input text 122. The input text 122 specifies target features toward which to modify (e.g. morph) the input image 120. For example, the input image 120 is a facial image of the user (a young man with no beard) and the input text 122 reads "Santa Claus," who is commonly depicted as an older man with a beard. In this example, the user is interested in modifying (e.g. morphing) the input image 120 to have features that resemble Santa Claus, as indicated by the input text 122. In some instances, the input image 120 and the input text 122 are provided to the image modification subsystem 104 by a client system 130 (e.g. an image modification service system, a user computing device executing an image modification application, etc.). In certain examples, a user uploads the input image 120 and enters the input text 122 and the client system 130 receives the input image 120 and the input text 122 and transmits, via the network 140, the input image 120 and the input text 122 to the image modification subsystem 104. In certain examples, the client system 130 is a user computing device and the user uploads or otherwise selects the input image 120 and inputs the input text 122 via a user interface of the user computing device. In some instances, the client system 130 includes an image modification application 131, which receives and communicates the selection of the input image 120 and input text 122 to the image modification subsystem 104 via the network 140. In some instances, the image modification system 102 provides, for download by the client system 130, the image modification application 131. In some instances, the image modification application 131 displays one or more images and a request to select an image, which could read "Please upload/select an image." The image modification application 131 receives a selection of the input image 120. In some instances, the image modification displays a request for an input text 122, which could read "Who/what would you like the selected image look like?" The image modification application 131, in some instances, provides a text field or other means of receiving the input text 122 (e.g. voice to text, selection of one or more words from a list, etc.)

In some instances, the image modification subsystem 104 receives a request to modify the input image 120 in accordance with the input text 122. For example, the user inputs the input text 122 (e.g. "Santa Claus"), uploads or otherwise selects the input image 120 (e.g. the image of a face of the user, a young man with no facial hair), and selects a user interface object that reads "Modify this image." In some instances, the image modification subsystem 104 receives the request (to modify the input image 120 in accordance with the input text 122) from the client system 130 via the network 140.

To generate a blended image 124, which is a modified input image 120 which includes features that resemble the input text 122, the item recommendation subsystem 104 employs an image modification model 109. Additional details about the image modification model 109 are provided below with respect to FIG. 2. Additional details about generating the blended image 124 by applying a trained image modification model 109 are provided below with respect to FIG. 3. Additional details about training the image modification model 109 are provided below with respect to FIG. 4. An illustration of additional details about selecting a starting latent code (a feature of the image modification model 109) are provided below with respect to FIG. 5. An illustration of additional details about blending a starting latent code with an input image latent code to generate a blended image latent code (a feature of the image modification model 109) are provided below with respect to FIG. 6. In certain examples, the image modification system 102 includes a request module 111 configured to receive an input image 120 and an input text 122 and a request to modify the input image 120 in accordance with the input text 122. In some examples, the image modification system 102 includes a request module 111, a latent code generator module 108, a Contrastive Language-Image Pretraining ("CLIP") code generator module 103, an initial latent code selection module 105, and a latent code blending module 107. In some instances, the request module 111 receives, from a client device 130 or other client system, an input image 120, an input text 122 and a request to generate a blended image 124. In some instances, the latent code generator module 108 generates an input image latent code from the input image 120. The CLIP code generator module 103 generates an input text CLIP code from the input text 122 (e.g. by applying a CLIP model to the input text 122). In some instances, the initial latent code selection module 105 selects, from the latent code library 117 including a set of CLIP codes 119 associated with a set of initial latent codes 118, an initial latent code 118-N having an associated CLIP code 119-N with a greatest similarity to the input text CLIP code 118-N. In some instances, the latent code blending module 107 generates a blended image latent code based on the input image latent code and the selected initial latent code 118-N. In some instances, the latent code generator module 108 generates a blended image 124 from the blended image latent code. In some instances, the request module 111 transmits, to the client device 130 or to the other client system responsive to the request to generate the blended image 124, the generated blended image 124. In some instances, the CLIP code generator module 103 generatesna blended image CLIP code based on the blended image 124.

The image modification system 102 determines and trains the image modification model 109 using the model training subsystem 106. The model training subsystem 106 builds and trains the image modification model 109. The model training subsystem 106, using the training data set 114, trains the image modification model 109. Additional details of training an image modification model 109 are described in FIG. 4. In various examples, the model training subsystem 106 can be implemented as one or more of program code, program code executed by processing hardware (e.g., a programmable logic array, a field-programmable gate array, etc.), firmware, or some combination thereof.

Example of an Image Modification Model

Figure 2:
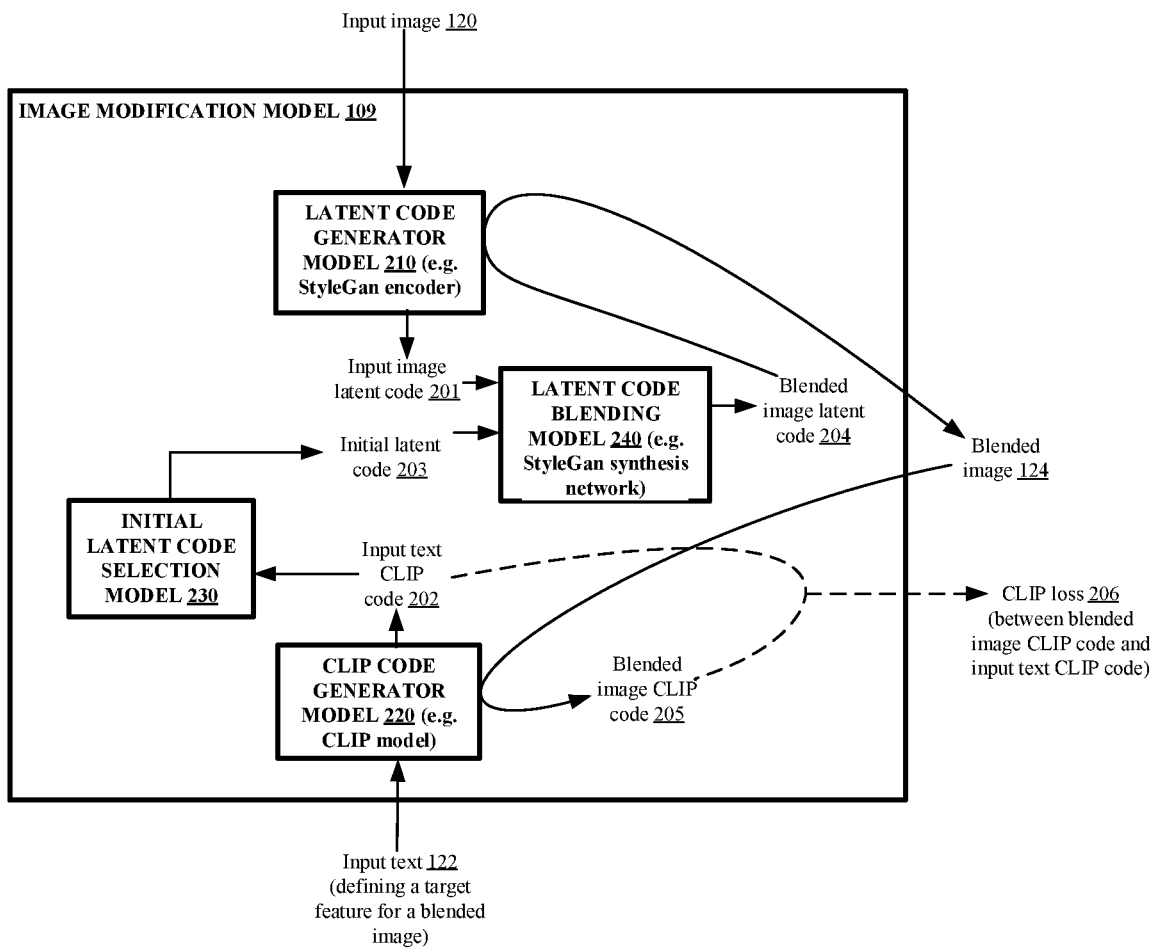
FIG. 2 depicts an example illustration of an image modification model for use in the computing environment of FIG. 1, according to certain embodiments disclosed herein.

FIG. 2 depicts an illustration of an image modification model 109 for use in certain embodiments described herein, for example as described FIG. 1 and FIGS. 3-6. As depicted in FIG. 2, the image modification model 109 includes a latent code generator model 210, a CLIP code generator model 220, an initial latent code selection model 230, and a latent code blending model 240. An example process for applying the image modification model 109 to an input image 120 and an input text 122 is described in FIG. 3 and an example process for training the image modification model 109 is described in FIG. 4. In certain examples, as depicted in FIG. 2, the image modification model 109 receives an input image 120 and an input text 122, for example, associated with a user request to modify the input image 120 in accordance with the input text 122. The image modification model 109 generates a blended image 124, which can be displayed to the user.

The latent code generator model 210 is configured to generate an input image latent code 201 for the input image 120. The latent code generator model 210, in some instances, is a StyleGAN encoder configured to project the input image 120 into StyleGAN latent space. The input image latent code 201 is a vector representation of the input image 120 for a set of-specific vectors (e.g. 18 layer-specific 1×512 vectors). In certain examples, the latent code generator model 210 is a mapping network (e.g. StyleGAN mapping network) configured to generate the set of layer-specific vectors. In some instances, particular layers correspond to specific features of an image. For example, in the context of a facial image, higher layers may represent course features (e.g. pose and hairstyle), and lower layers may represent features such as color scheme and details.

The CLIP code generator model 220 is configured to generate an input text CLIP code 202 for the input text 122. For example, the input text 122 specifies target features toward which to modify the input image 120. In some instances, the input text CLIP code 202 is text embedding generated from the input text 122. In some instances, semantically-related but different input texts 122 could yield a common input text CLIP code 202. The input text CLIP 202 is a matrix or array [B, 512] of B rows and 512 columns, for all text inputs, where B (rows) is the number of text inputs in each batch The initial latent code selection model 230 is configured to select, from a latent code library 117, an initial latent code 203 with which to perform, by the latent code blending model 240, a latent code blending process of the initial latent code 203 with the input image latent code 201. The latent code library 117 includes a set of N initial latent codes ("ILCs") 118 (e.g. ILC 118-0, ILC 118-1, . . . ILC 118-N as depicted in FIG. 1), where each of the set of initial latent codes 118 is associated with a respective CLIP code ("CC")

of a set of CCs 119 (e.g. CC 119-0, CC 119-1, ... CC 119-N as depicted in FIG. 1). The initial latent code selection model 230 is configured to determine, for each of the set of CCs 119, a similarity of the CC 119 to the input text CLIP code 202. The initial latent code selection model 230 is configured to select an initial latent code 203, from the set of ILCs 118, that is associated with a CC 119 having the greatest determined similarity to the input text clip code 202. Accordingly, the latent code selection model 230, in some instances, selects the initial latent code 203, from the set of ILCs 118, that is the most semantically-similar to the input text 122.

Figure 6:
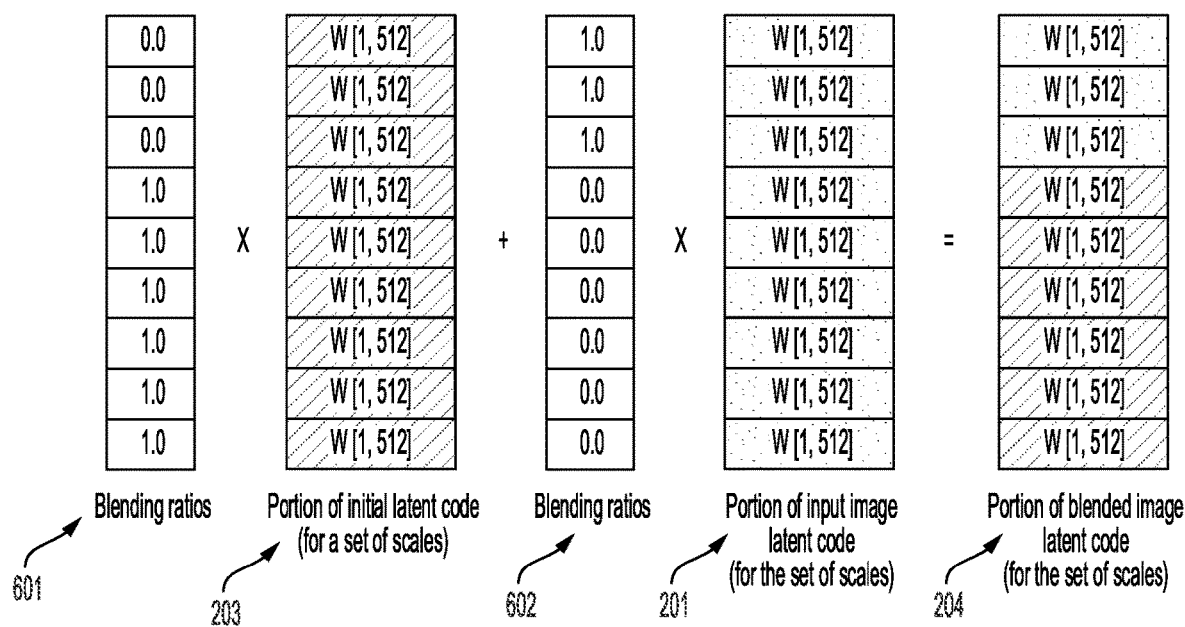
FIG. 6 depicts an example illustration of blending, by an image modification model, an initial latent code with an input image latent code, according to certain embodiments disclosed herein.

The latent code blending model 240 is configured to blend the input image latent code 201 generated by the latent code generator model 210 with the initial latent code 203 selected from the latent code library 117 by the initial latent code selection model 230. The latent code blending model 240, in some embodiments, is a StyleGAN synthesis network. In certain embodiments, the blending of the input image latent code 201 and the initial latent code 203 to generate the blended image latent code 204 is performed on a layer specific basis. For example, the input image latent code 201 and the initial latent code 203, in some instances, each comprise 18 vectors of size 1×512 and a blending operation is performed for each of the 18 vectors. An illustration of a layer specific blending process to generate a portion of a blended image latent code 204 is illustrated in FIG. 6.

As depicted in FIG. 2, the latent code generator model 210 is configured to generate a blended image from the blended image latent code 124 generated by the latent code blending model 240. For example the latent code generator model 210 can generate a latent code for an image and can generate an image from a latent code. As depicted in FIG. 2, the CLIP code generator model 220 is configured to generate, for the blended image 124 generated by the latent code generator model 210 from the blended image latent code 204, a blended image CLIP code 205. As depicted in FIG. 2, the image modification model 109 is configured to determine a CLIP loss 206 based on the input text CLIP code 202 and the blended image CLIP code 205, which were determined by the CLIP code generator model 220. In some instances, determining the CLIP loss 206 includes applying a loss function to the input text CLIP code 202 and the blended image CLIP code 205. In certain embodiments, during a training phase, one or more parameters of the image modification model 109 can be modified based on the determined CLIP loss 206. Additional details about training the image modification model 109 are described in FIG. 4.

Figure 3:
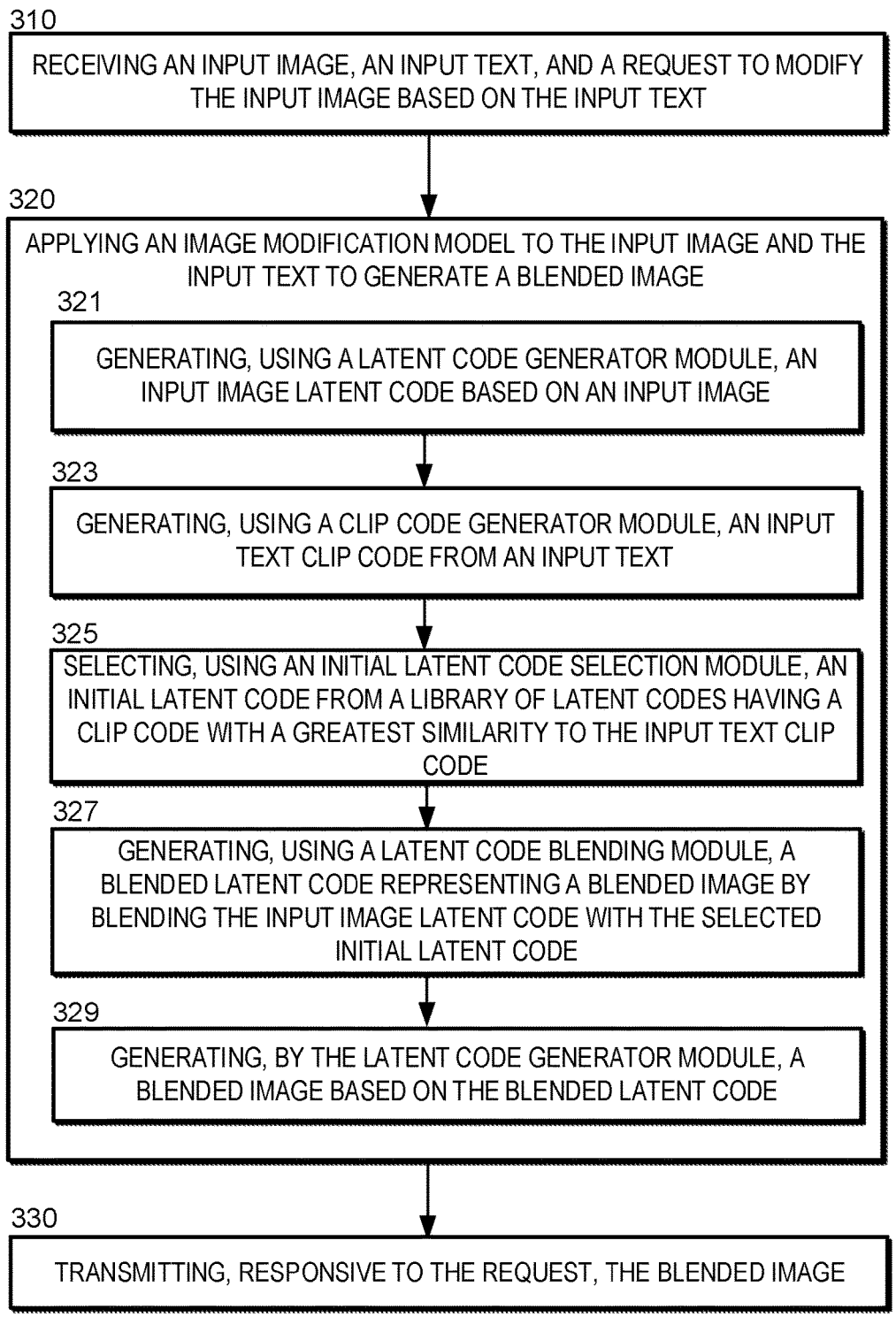
FIG. 3 depicts a process for generating a blended image by applying an image modification model to an input image and an input text, according to certain embodiments disclosed herein.

Examples of Computer-Implemented Operations for Generating a Blended Image Based on an Input Image and an Input Text FIG. 3 depicts an example of a process for generating a blended image 124 by applying an image modification model 109 to an input image 120 and an input text 122. One or more computing devices (e.g., the image modification system 102 or the individual modules contained therein) implement operations depicted in FIG. 3. For illustrative purposes, the process 200 is described with reference to certain examples depicted in the figures. Other implementations, however, are possible.

At block 310, the method 300 involves receiving an input image 120, an input text 122, and a request to modify the input image 120 based on the input text 122. In an embodiment, the client system 130 (e.g. a user computing device) transmits the input image 120 and the input text 122 via the network 140. In certain embodiments, the image modification subsystem 104 receives the input image 120 using a receipt module. For example, the user selects the input image 120 and inputs the input text 122 via an image modification application 131 (or web browser application) on the user computing device, which communicates with the image modification system 102 via the network 140. The image modification application 131 (or web browser application) is configured to transmit a request to modify an input image 120 according to an input text 122 responsive to receiving inputs from the user and to display a blended image 124 generated by the image modification system 102. In some instances, the input image 120 is a human facial image of the user or other human facial image. In other instances, the input image 120 is a non-human facial image, an image of an object, a landscape, or other type of image. In some instances, the input text 122 is a set of words provided by the user that specify how the user desires for the input image 120 to be modified. For example, the input text 122 includes one or more target features (e.g. a hairstyle, a hair color, a hair length, a skin color, an eye color, an age, a gender, a profession, a facial expression, or other feature or combination of features), a target identity (e.g. a celebrity or other person's name). For example, the user desires an image of the user with features that look like George Washington. In this example, the user provides an input text 122 of "George Washington" (a historical figure with characteristic facial features and wears a grey wig) and an input image 120 of the user's face (e.g. a young man with a red hair). In certain examples, the request module of item recommendation system 102 is configured to receive the input image 120, the input text 122, and a request to modify the input image 120 in accordance with the input text 122. For example, the user desires to receive an image including features both of the user (from the input image 120) and of George Washington (as specified by the input text 122).

At block 320, the method 300 involves applying an image modification model 109 to the input image 120 and the input text 122 to generate a blended image 124. In some embodiments, block 320 includes implementing blocks 321, 323, 325, 327, and 329.

At block 321, the method 300 involves generating, using a latent code generator module, an input image latent code 201. In certain examples, the latent code generator module applies the latent code generator model 210 to the input image 120. In some instances, the latent code generator model 210 is a StyleGAN encoder configured to project the input image 120 into StyleGAN latent space. The input image latent code 201 is a vector representation of the input image 120 for a set of layer-specific vectors (e.g. 18 layer-specific 1×512 vectors). In certain examples, the latent code generator model 210 is a mapping network (e.g. StyleGAN mapping network) configured to generate the set of layer-specific vectors. Continuing with the previous example, the input image 120 is an image of the user and the image modification system 102 generates an input image latent code 201 representing the image of the user's face.

At block 323, the method 300 involves generating, using a clip code generator module, an input text clip code 202 from the input text 122. In certain examples, the clip code generator module generates the input text clip code 202 by applying the clip code generator model 220 to the input text 122. For example, the input text 122 specifies target features toward which to modify the input image 120. In some instances, the input text CLIP code 202 is text embedding generated from the input text 122. In some instances, semantically-related but different input texts 122 could yield a common input text CLIP code 202. For example, continuing with the example described previously, the input text CLIP code 202 generated for input text 122 "George Washington" is a matrix or array [B, 512] of B rows and 512 columns, for all text inputs, where B (rows) is the number of text inputs in each batch.

At block 325, the method 300 involves selecting, using an initial latent code selection module, an initial latent code 203 from a library of latent codes having a CLIP code with a greatest similarity to the input text CLIP code 202. In certain examples, the initial latent code selection module applies the initial latent code selection model 230 to the input text CLIP code 202 to select an initial latent code 118 from the library. The latent code library 117 includes a set of N initial latent codes ("ILCs") 118 (e.g. ILC 118-0, ILC 118-1, . . . ILC 118-N as depicted in FIG. 1), where each of the set of initial latent codes 118 is associated with a respective CLIP code ("CC") of a set of CCs 119 (e.g. CC 119-0, CC 119-1, . . . CC 119-N as depicted in FIG. 1). The initial latent code selection model 230 is configured to determine, for each of the set of CCs 119, a similarity of the CC 119 to the input text CLIP code 202. The initial latent code selection model 230 is configured to select an initial latent code 203, from the set of ILCs 118, that is associated with a CC 119 having the greatest determined similarity to the input text clip code 202. Accordingly, the latent code selection model 230, in some instances, selects the initial latent code 203, from the set of ILCs 118, that is the most semantically-similar to the input text 122. Continuing with the previous example, an example first CLIP code associated with a first initial latent code in the latent code library representing an image of a young woman's face has a lesser similarity to the input text clip code 202 (determined from the input text 122 "George Washington") than a second CLIP code associated with a second initial latent code representing an image of an older man's face with white hair.

At block 327, the method 300 involves generating, using a latent code blending module, a blended latent code 204 representing a blended image 125 by blending the input image latent code 201 with the selected initial latent code 203. The latent code blending module, in some embodiments, uses the latent code blending model 240 (e.g. a StyleGAN synthesis network) to blend the input image latent code 201 with the selected initial latent code 203. In certain embodiments, the blending of the input image latent code 201 and the initial latent code 203 to generate the blended image latent code 204 is performed on a layer specific basis. For example, the input image latent code 201 and the initial latent code 203, in some instances, each comprise 18 vectors of size 1×512 and a blending operation is performed for each of the 18 vectors. An illustration of a layer specific blending process to generate a portion of a blended image latent code 204 is illustrated in FIG. 6. Continuing with the previous example, the selected initial latent code 203 (of a face of an older man with white hair) is blended with the input image latent code 202 (determined from the image of the face of the user, a young man with red hair).

In certain embodiments, the latent code blending module uses the latent code blending model 240 to further blend the blended latent code 204 with the input image latent code 201 to generate a subsequent blended latent code 204. In other embodiments, the latent blending module does not generate the subsequent blended latent code 204.

At block 329, the method 300 involves generating, by the latent code generator module, the blended image 125 based on the blended latent code 204. In some instances, the latent code generator module generates the blended image 125 based on the subsequent blended latent code 204, which is a blend of the blended latent code 204 and the input image latent code 201. The latent code generator module can, using the latent code generator model 210, both generate a latent code from an image and generate an image from a latent code. Continuing with the previous example, the blended image 125 includes features of the user (determined from the input image latent code) as well as George Washington (indicated by the input text 122). For example, the blended image 125 may include the young man's facial structure, but with a gray wig similar to George Washington. In another example, the blended image 125 may include George Washington's facial structure, but with a reddish gray wig (in between the user's hair color and the grey color of George Washington's wig).

At block 330, the method 300 involves transmitting, by the image modification system 102 and responsive to the request, the blended image 124. For example, the image modification subsystem 104 transmits blended image 124 to the system from which the request to modify the input image 120 was received (e.g. the client system 130, which, in some instances, is a user computing device). In some embodiments, the image modification system 102 stores the blended image 124 in the data store 110, which is accessible to the client system 130, and the client system 130 accesses the blended image 124 via the network 140. In some embodiments, the image modification subsystem 104, or the client system 130 to which the blended image 124 is transmitted, modifies features of an online computing environment based on the blended image 124 generated by the image modification model 109 for the input image 120 and the input text 122. In some instances, modifying the features of the online computing environment include presenting, in a user interface (e.g. via an image modification website hosted by the client system 130) the blended image 124.

Figure 4:
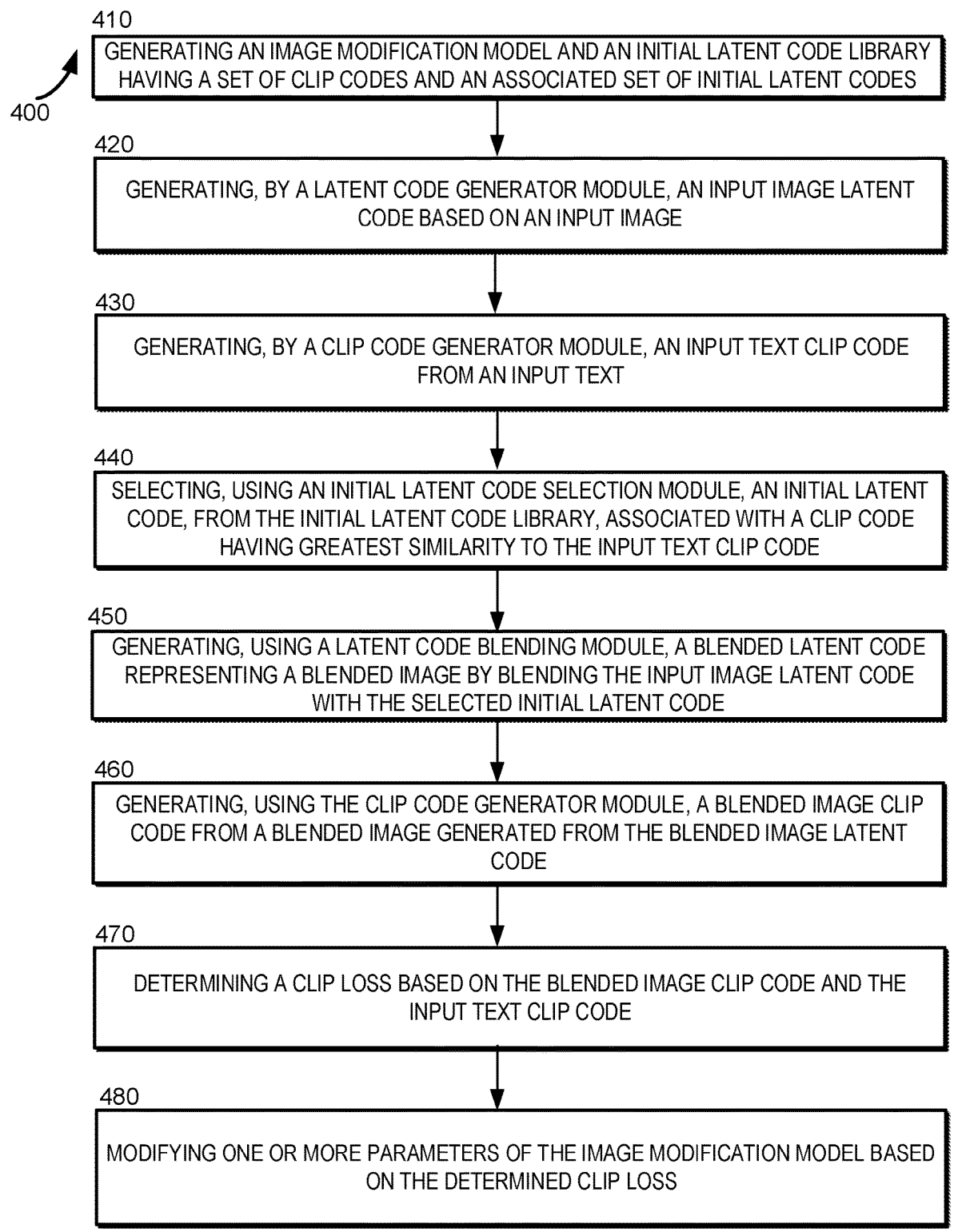
FIG. 4 depicts an example of a process for training an image modification model, according to certain embodiments disclosed herein.

FIG. 4 depicts an example of a process 400 for training an image modification model 109, according to certain embodiments disclosed herein. One or more computing devices (e.g., the image modification system 102 or the model training subsystem 106) implement operations depicted in FIG. 4. For illustrative purposes, the process 400 is described with reference to certain examples depicted in the figures. Other implementations, however, are possible.

At block 410, the method 400 involves constructing an image modification model 109 and an initial latent code library 117 having a set of clip codes 119 and an associated set of initial latent codes 118. The image modification model 109, in some instances, includes a latent code generator model 210, a CLIP code generator model 220, an initial latent code selection model 230, and a latent code blending model 240. Details of an example image modification model 109 are described in FIG. 2 herein.

An example initial latent code library 117 is depicted in FIG. 1. In some instances, the latent code library 117 is generated from a set of training images and includes, for each of the set of images, a set of N initial latent codes ("ILCs") 118 (e.g. ILC 118-0, ILC 118-1, . . . ILC 118-N), where each of the set of initial latent codes 118 is associated with a respective CLIP code ("CC") of a set of CCs 119 (e.g. CC 119-0, CC 119-1, . . . CC 119-N). For example, ILC 118-0 is associated with CC 119-0, ILC 118-1 is associated with CC 119-1, etc. In certain embodiments, the set of ILCs 118 is generated by applying an encoder to each of the set of images and the set of CCs 119 is generated by applying a CLIP model to each of the set of images. For example, ILC 118-0 is generated by applying an encoder to an image and CC 119-0 is associated with the ILC 118-0 is generated by applying a CLIP model to the image.

In certain embodiments, blocks 420, 430, 440, and 450 of FIG. 4 substantially correspond to blocks 321, 323, 325, and 327 of FIG. 3, respectively.

At block 420, the method 400 involves generating, by a latent code generator module, an input image latent code 201 based on an input image 120. In some instances, generating the input image latent code 201 includes applying the latent code generator model 210 to the input image 120. The input image latent code 201 is a vector representation of the input image 120 for a set of layer-specific vectors (e.g. 18 layer-specific 1×512 vectors). In certain examples, the latent code generator model 210 is a mapping network (e.g. StyleGAN mapping network) configured to generate the set of layer-specific vectors.

At block 430, the method 400 involves generating, by a clip code generator module, an input text CLIP code 202 based on the input text 222. In some instances, generating the input text CLIP code 202 includes applying the clip code generator model 220 to the input text 222. For example, the input text 122 specifies target features toward which to modify the input image 120. In some instances, generating the input text clip code 202 includes applying the CLIP code generator model 220 to the input text 222. In some instances, the input text CLIP code 202 is text embedding generated from the input text 122. In some instances, semantically-related but different input texts 122 could yield a common input text CLIP code 202.

At block 440, the method 400 involves selecting, using an initial latent code selection module, an initial latent code 203, from the latent code library 117, associated with a CLIP code having a greatest similarity to the input text CLIP code 202. In some instances, selecting the initial latent code 203 from the latent code library 117 includes applying the initial latent code selection model 230 to the input text CLIP code 202. The latent code library 117 includes a set of N initial latent codes ("ILCs") 118 (e.g. ILC 118-0, ILC 118-1, . . . ILC 118-N as depicted in FIG. 1), where each of the set of initial latent codes 118 is associated with a respective CLIP code ("CC") of a set of CCs 119 (e.g. CC 119-0, CC 119-1, . . . CC 119-N as depicted in FIG. 1). The initial latent code selection model 230 is configured to determine, for each of the set of CCs 119, a similarity of the CC 119 to the input text CLIP code 202. The initial latent code selection model 230 is configured to select an initial latent code 203, from the set of ILCs 118, that is associated with a CC 119 having the greatest determined similarity to the input text clip code 202. Accordingly, the latent code selection model 230, in some instances, selects the initial latent code 203, from the set of ILCs 118, that is the most semantically-similar to the input text 122.

At block 450, the method 400 involves generating, using a latent code blending module, a blended latent code 204 representing a blended image 125 by blending the input image latent code 201 with the selected initial latent code 203. In some instances, generating the blended latent code 204 includes applying the latent code blending model 240 to the input image latent code 201 and the selected initial latent code 203. The latent code blending module, in some embodiments, uses a StyleGAN synthesis network to blend the input image latent code 201 with the selected initial latent code 203. In certain embodiments, the blending of the input image latent code 201 and the initial latent code 203 to generate the blended image latent code 204 is performed on a layer specific basis. For example, the input image latent code 201 and the initial latent code 203, in some instances, each comprise 18 vectors of size 1×512 and a blending operation is performed for each of the 18 vectors. An illustration of a layer specific blending process to generate a portion of a blended image latent code 204 is illustrated in FIG. 6.

At block 460, the method 400 involves generating, using the CLIP code generator module, a blended image CLIP code 205 from a blended image 124 generated from the blended image latent code 204. For example, the CLIP code generator module applies the CLIP code generator model 220 to the blended image 124 to generate the blended image CLIP code 205. In some instances, the input text CLIP code 202 is text embedding generated from the input text 122. In some instances, semantically-related but different input texts 122 could yield a common input text CLIP code 202.

At block 470, the method 400 involves determining a CLIP loss 206 based on the blended image CLIP code 205 and the input text CLIP code 202. The CLIP loss 206, in some instances, is an inverse cosine similarity between the blended image CLIP code 205 and the input text CLIP code 202. The inverse cosine similarity may be a cosine distance in CLIP latent space. A CLIP loss 206, $\mathcal{L}_{CLIP}(w)$, can be represented as:

$$\mathcal{L}_{CLIP}(w) = D_{CLIP}(G(w+M_t(w)), t) \qquad \text{Equation (1)},$$

where G represents the latent code blending model 240 (e.g. a StyleGAN generator model), w represents the selected initial latent code 203, $M_t(w)$ represents a manipulation to the selected initial latent code 203, t represents the input text CLIP code 202, and $D_{CLIP}()$ represents determining a cosine distance in CLIP latent space.

In certain embodiments, an identity loss, $\mathcal{L}_{ID}(w)$, is determined based on the following equation:

$$\mathcal{L}_{ID}(w) = 1 - \langle R(G(w_s)), R(G(w)) \rangle \qquad \text{Equation (2)},$$

where G represents the latent code blending model 240, $w_s$ represents the input image latent code 201, w represents the initial latent code 203, R is a pretrained network for facial recognition (e.g. an ArcFace network), and $\langle \rangle$ computes a cosine similarity between its arguments. In certain embodiments, a combined loss, $\mathcal{L}(w)$, is determined based on the losses determined in Equation (1) and Equation (2). In certain embodiments, a weighted combined loss is determined, for example, using the following equation:

$$\mathcal{L}(w) = \mathcal{L}_{CLIP}(w) + \lambda_{L2}\|M_t(w)\|_2 + \lambda_{ID}\mathcal{L}_{ID}(w) \qquad \text{Equation (3)},$$

where $\lambda_{L2}$ and is $\lambda_{ID}$ are parameter values. In some instances, these $\lambda_{L2}$ and is $\lambda_{ID}$ parameters can be modified based on a nature of a desired image modification operation. For example, if the input text 122 indicates a change, for the input image, to another identity (e.g. input text of "George Washington"), the $\lambda_{ID}$ can be set to a lower value (or $\lambda_{L2}$ can be set to a higher value) than for input text 122 that does not indicate a change to another identity (e.g. input text of "blond hair"). In some instances, the image modification system 102 may determine whether the input text 122 corresponds to a change in identity and modify one or more of the parameters $\lambda_{L2}$ and is $\lambda_{ID}$ based on the determination.

At block 480, the method 400 involves modifying parameters of the image modification model 109 based on the determined CLIP loss 206. For example, the model training subsystem 106 adjusts parameters of one or more of the latent code generator model 210, the CLIP code generator model 220, the initial latent code selection model 230, and/or the latent code blending model 240 based on the determined CLIP loss 206. In some instances the model training subsystem 106 adjusts parameters of one or more of the submodels of the image modification model 109 based on a determined combined loss (e.g. as in Equation 3), where the combined loss is determined based on the CLIP loss 206 and an identity loss.

In some embodiments, blocks 450-480 can be repeated for a number of iterations to optimize an output of the image modification model 109 by minimizing the determined CLIP loss 206. In certain examples, the number of training iterations is predefined. For example, after the blended image 125 is generated and one or more parameters of one or more of the submodels 210, 220, 230, and 240 of the model 109 is modified, the blended image latent code 206 takes the place of the initial latent code 204 with respect to blocks 450-480.

In certain embodiments, blocks 410-480 are repeated, iteratively, in a gradient descent optimization process to minimize the CLIP loss 206. In some instances, an optimization method, for example, a Broyden, Fletcher, Goldfarb, and Shanno ("BFGS") algorithm, or a limited memory BFGS ("L-BFGS") algorithm, may be used to minimize the CLIP loss 206.

Figure 5:
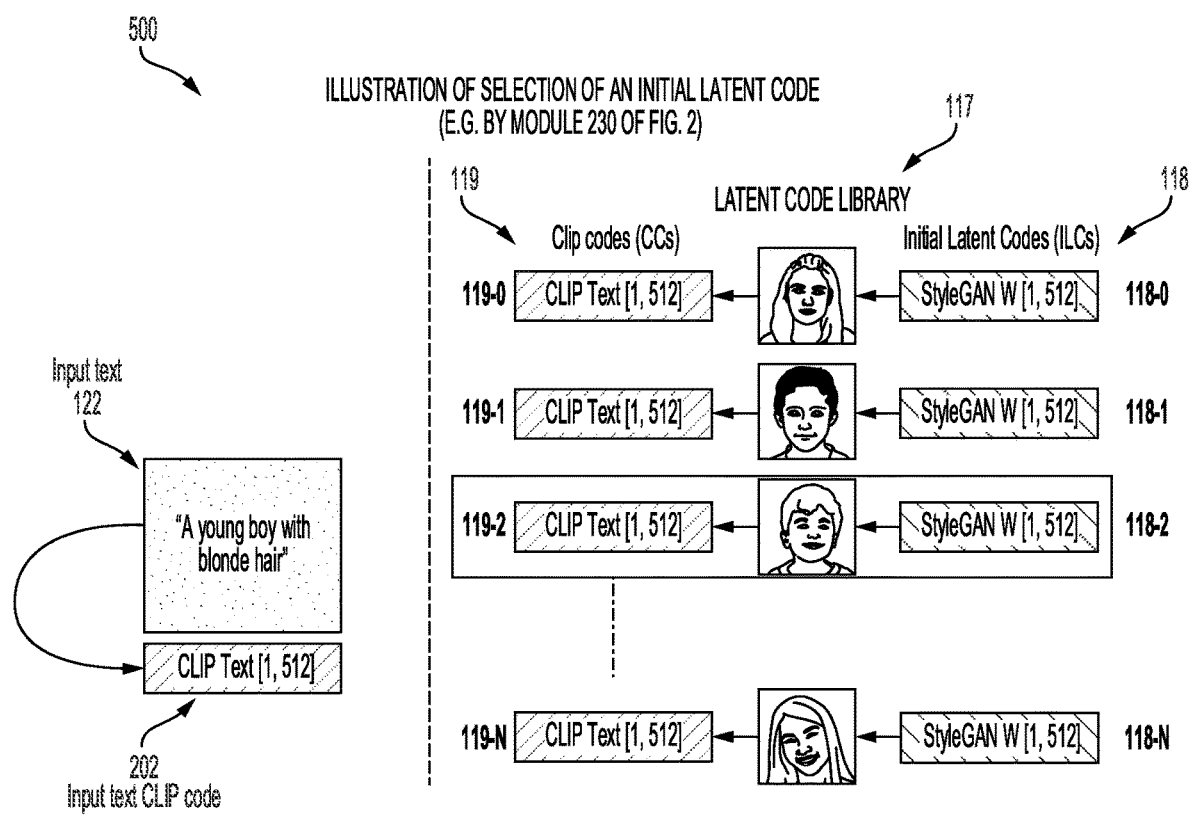
FIG. 5 depicts an example illustration of selecting, by an image modification model, an initial latent code from which to generate a blended image, according to certain embodiments disclosed herein.

FIG. 5 depicts an example illustration 500 of selecting, by an image modification model, an initial latent code from which to generate a blended image, according to certain embodiments disclosed herein. For illustrative purposes, the illustration 500 is described with reference to certain examples depicted in the figures. Other implementations, however, are possible. As shown FIG. 5, the image modification system 102 receives, from a client system 130 (a user computing device operated by a user), an input text 122 that reads "A young boy with blonde hair." The image modification system 102 receives the input text 122 along with an input image 120 (e.g. an image of the user's face). The image modification system 102, using the CLIP code generator model 220, generates an input text CLIP code 202. The image modification system 102 selects, from the latent code library 117 of CLIP codes (CCs) 119 and associated initial latent codes (ILCs) 118, a CLIP code 119 that is most similar to the input text CLIP code 202. In the example depicted in FIG. 5, the latent code library 117 includes N CLIP codes 119 (e.g. CC 119-0, CC 119-1, CC 119-2 ... CC 119-N, as depicted) and an associated N initial latent codes 118 (ILC 118-0, ILC 118-1, ILC 118-2, ... ILC 118-N, as depicted). The image modification system 102 may use the initial latent code selection model 230 to select the initial latent code 118 associated with the CLIP code 119 in the latent code library 117 that is most similar to the input text CLIP code 202. In the example of FIG. 5, CC 119-2 is most similar to the input text CLIP code 202 and, therefore, the image modification system 102 selects ILC 119-2, which is associated with CC 119-2, as the initial latent code 119 for which to conduct an image modification process using the latent code blending model 240.

FIG. 6 depicts an example illustration of blending, by an image modification model, an initial latent code with an input image latent code, according to certain embodiments disclosed herein. FIG. 6 illustrates blending, by a latent code blending model 240, a portion of an initial latent code 203 with a corresponding portion of an input image latent code 201. As shown in FIG. 6, both the portion of the initial latent code 203 and the portion of the input image latent code 201 each includes 9 layers, each layer being a 1×512 vector. In certain embodiments, a full initial latent code includes 18 layers, where each layer is a 1×512 vector. As shown in FIG. 6, each layer of the portion of the initial latent code 203 includes an associated blending ratio 601, and each layer of the portion of the input image latent code 201 includes an associated blending ratio 602. As shown in FIG. 6, the blending ratio determines how much of the respective layer will be considered by the latent code blending model 240 in a blending process. The ratios 601 and 602 depicted in FIG. 6 are either 0.0 or 1.0, however, other values between 0 and 1 may be used, and the sum of the ratios 601 and 602 for each layer is equal to one (1). For example, a layer of the initial latent code 203 may be assigned a ratio 601 of 0.75 and a corresponding layer of the input image latent code 201 may be assigned a ratio 602 of 0.25. In the example in FIG. 6, the top three layers are assigned a ratio 601 of 0.0 and a ratio 602 of 1.0, and the bottom six layers are assigned a ratio 601 of 1.0 and a ratio 602 of 0.0. Accordingly, in the example of FIG. 6, in the final portion of blended image latent code 204, the top three layers are the corresponding layers of the input image latent code 201 and the bottom six layers are the corresponding layers of the initial latent code 203.

Examples of Computing Environments for Implementing Certain Embodiments

Figure 7:
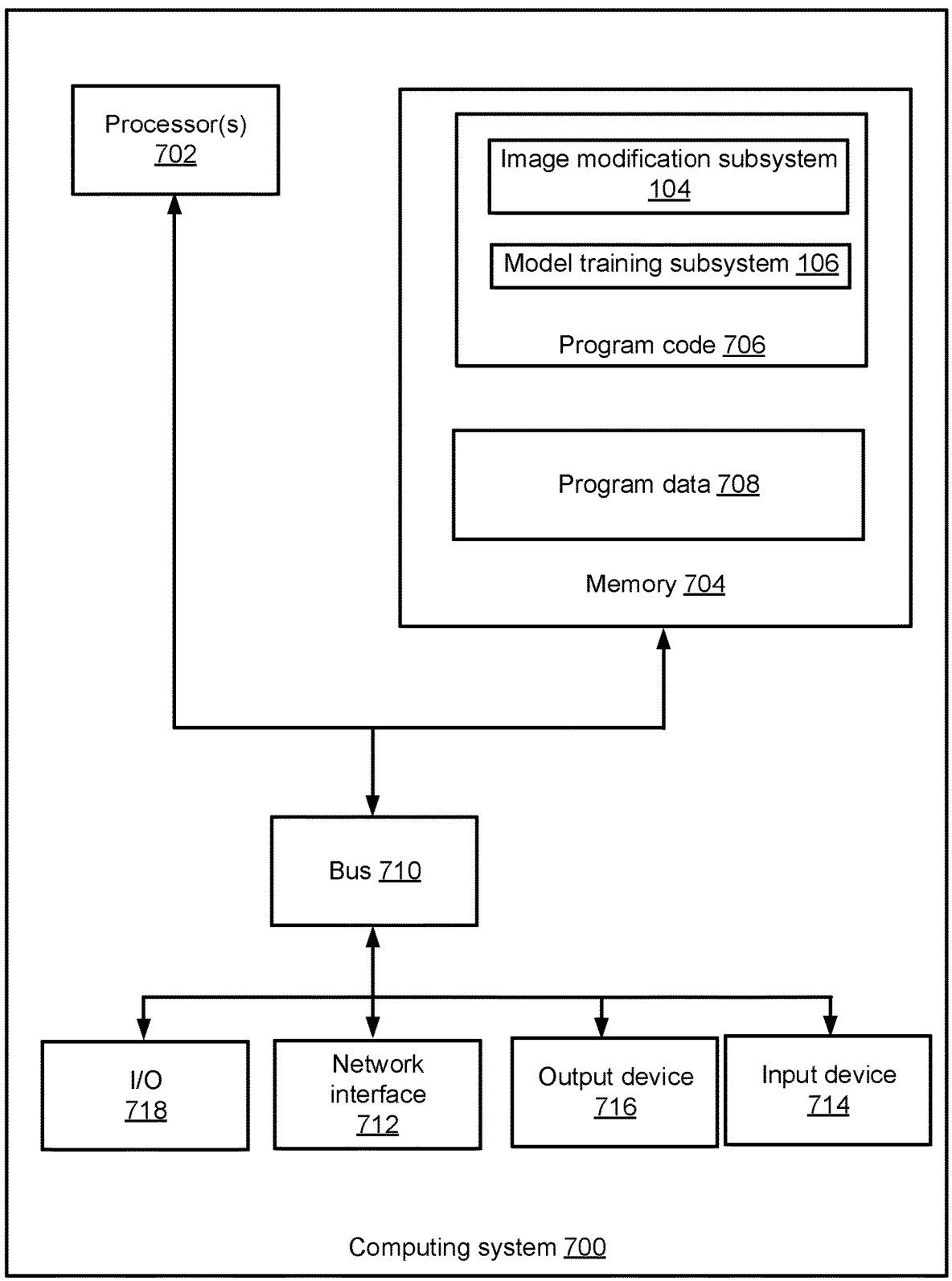
FIG. 7 depicts an example of a computing system that performs certain operations described herein, according to certain embodiments described in the present disclosure.

Any suitable computer system or group of computer systems can be used for performing the operations described herein. For example, FIG. 7 depicts an example of a computer system 700. The depicted example of the computer system 700 includes a processing device 702 communicatively coupled to one or more memory components 704. The processing device 702 executes computer-executable program code stored in a memory components 704, accesses information stored in the memory component 704, or both. Execution of the computer-executable program code causes the processing device to perform the operations described herein. Examples of the processing device 702 include a microprocessor, an application-specific integrated circuit ("ASIC"), a field-programmable gate array ("FPGA"), or any other suitable processing device. The processing device 702 can include any number of processing devices, including a single processing device.

The memory components 704 includes any suitable non-transitory computer-readable medium for storing program code 706, program data 708, or both. A computer-readable medium can include any electronic, optical, magnetic, or other storage device capable of providing a processing device with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the memory components 404 can be volatile memory, non-volatile memory, or a combination thereof.

The computer system 700 executes program code 706 that configures the processing device 702 to perform one or more of the operations described herein. Examples of the program code 706 include, in various embodiments, the item recommendation system 102 (including the recommender subsystem 104 as well as the request module, the unbiased conversion rate prediction module, the biased conversion rate prediction module, the item selection module, and/or other modules of the item recommendation system 120 and the model training subsystem 106 described herein) of FIG. 1, which may include any other suitable systems or subsystems that perform one or more operations described herein (e.g., one or more neural networks, encoders, attention propagation subsystem and segmentation subsystem). The program code 706 may be resident in the memory components 704 or any suitable computer-readable medium and may be executed by the processing device 702 or any other suitable processor.

The processing device 702 is an integrated circuit device that can execute the program code 706. The program code 706 can be for executing an operating system, an application system or subsystem, or both. When executed by the processing device 702, the instructions cause the processing device 702 to perform operations of the program code 706. When being executed by the processing device 702, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory components 704 store the program data 708 that includes one or more datasets described herein. In some embodiments, one or more of data sets are stored in the same memory component (e.g., one of the memory components 704). In additional or alternative embodiments, one or more of the programs, data sets, models, and functions described herein are stored in different memory components 704 accessible via a data network. One or more buses 710 are also included in the computer system 700. The buses 710 communicatively couple one or more components of a respective one of the computer system 700.

In some embodiments, the computer system 700 also includes a network interface device 712. The network interface device 712 includes any device or group of devices suitable for establishing a wired or wireless data connection to one or more data networks. Non-limiting examples of the network interface device 712 include an Ethernet network adapter, a modem, and/or the like. The computer system 700 is able to communicate with one or more other computing devices via a data network using the network interface device 912.

The computer system 700 may also include a number of external or internal devices, an input device 714, a presentation device 716, or other input or output devices. For example, the computer system 700 is shown with one or more input/output ("I/O") interfaces 718. An I/O interface 718 can receive input from input devices or provide output to output devices. An input device 714 can include any device or group of devices suitable for receiving visual, auditory, or other suitable input that controls or affects the operations of the processing device 702. Non-limiting examples of the input device 714 include a touchscreen, a mouse, a keyboard, a microphone, a separate mobile computing device, etc. A presentation device 716 can include any device or group of devices suitable for providing visual, auditory, or other suitable sensory output. Non-limiting examples of the presentation device 716 include a touchscreen, a monitor, a speaker, a separate mobile computing device, etc.

Although FIG. 7 depicts the input device 714 and the presentation device 716 as being local to the computer system 7700, other implementations are possible. For instance, in some embodiments, one or more of the input device 714 and the presentation device 716 can include a remote client-computing device that communicates with computing system 700 via the network interface device 712 using one or more data networks described herein.

Embodiments may comprise a computer program that embodies the functions described and illustrated herein, wherein the computer program is implemented in a computer system that comprises instructions stored in a machine-readable medium and a processing device that executes the instructions to perform applicable operations. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 8:
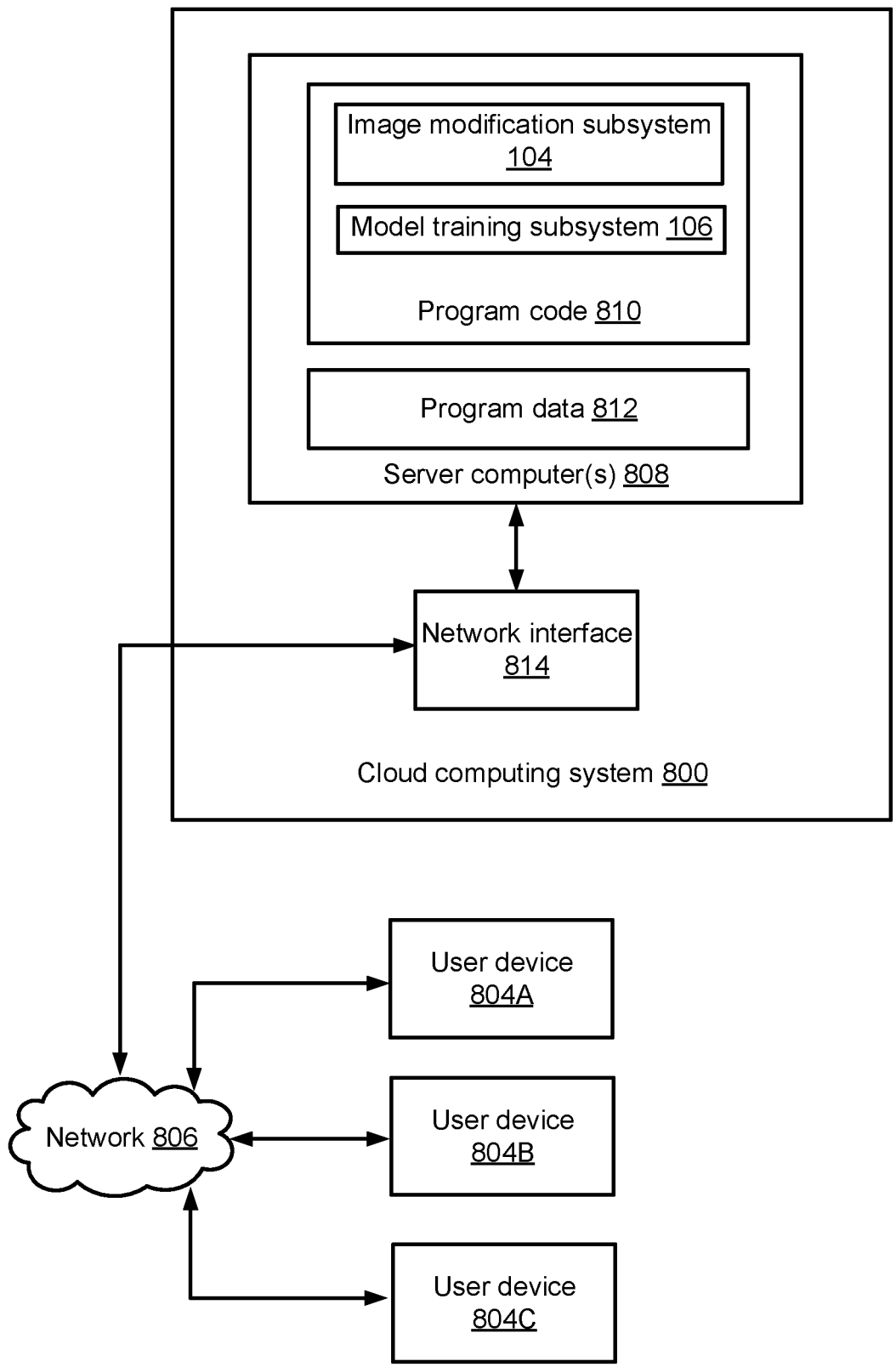
FIG. 8 an example of a cloud computing system that performs certain operations described herein, according to certain embodiments described in the present disclosure.

In some embodiments, the functionality provided by computer system 700 may be offered as cloud services by a cloud service provider. For example, FIG. 8 depicts an example of a cloud computer system 800 offering a service for selecting, for a set of recommendable items 120, a contrast group 124 that includes a recommended item 122 and contrast items 123, that can be used by a number of user subscribers using user devices 804A, 804B, and 804C across a data network 806. In the example, the service for selecting, for a set of recommendable items 120, a contrast group 124 that includes a recommended item 122 and contrast items 123 may be offered under a Software as a Service (SaaS) model. One or more users may subscribe to the service for selecting, for a set of recommendable items 120, a contrast group 124 that includes a recommended item 122 and contrast items 123, and the cloud computer system 800 performs the processing to provide the service for selecting, for a set of recommendable items 120, a contrast group 124 that includes a recommended item 122 and contrast items 123 to subscribers. The cloud computer system 800 may include one or more remote server computers 808.

The remote server computers 808 include any suitable non-transitory computer-readable medium for storing program code 810 (e.g., the recommender subsystem 104 and the model training subsystem 106 of FIG. 1) and program data 812, or both, which is used by the cloud computer system 800 for providing the cloud services. A computer-readable medium can include any electronic, optical, magnetic, or other storage device capable of providing a processing device with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the server computers 508 can include volatile memory, non-volatile memory, or a combination thereof.

One or more of the server computers 808 execute the program code 810 that configures one or more processing devices of the server computers 808 to perform one or more of the operations that provide recommended item 122 and contrast group 124 selection services. As depicted in the embodiment in FIG. 8, the one or more servers providing the services for selecting, for a set of recommendable items 120, a contrast group 124 that includes a recommended item 122 and contrast items 123 may implement the recommender subsystem 104 and the model training subsystem 106. Any other suitable systems or subsystems that perform one or more operations described herein (e.g., one or more development systems for configuring an interactive user interface) can also be implemented by the cloud computer system 800.

In certain embodiments, the cloud computer system 800 may implement the services by executing program code and/or using program data 812, which may be resident in a memory component of the server computers 808 or any suitable computer-readable medium and may be executed by the processing devices of the server computers 808 or any other suitable processing device.

In some embodiments, the program data 812 includes one or more datasets and models described herein. In some embodiments, one or more of data sets, models, and functions are stored in the same memory component. In additional or alternative embodiments, one or more of the programs, data sets, models, and functions described herein are stored in different memory components accessible via the data network 806.

The cloud computer system 800 also includes a network interface device 814 that enable communications to and from cloud computer system 800. In certain embodiments, the network interface device 814 includes any device or group of devices suitable for establishing a wired or wireless data connection to the data networks 806. Non-limiting examples of the network interface device 814 include an Ethernet network adapter, a modem, and/or the like. The recommended item 122 and contrast group 124 selection service is able to communicate with the user devices 804A, 804B, and 804C via the data network 806 using the network interface device 814.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied— for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method, comprising:
    receiving, by a request module, an input text and a request for a blended image;
    generating, by a contrastive language-image pre-training ("CLIP") module for the input text, an input text CLIP code;
    selecting, by an initial latent code selection module, an initial latent code from among a set of latent codes, the selection based on a the initial latent code having a corresponding CLIP code with a greatest semantic similarity to the input text CLIP code;
    generating, by a latent code blending module, a blended image latent code by blending the initial latent code with an input image latent code determined for an input image; and
    generating, by a latent code generator module, the blended image from the blended image latent code; and
    transmitting, by the request module responsive to the request, the blended image.

2. The method of claim 1, wherein the input text specifies target features for modifying the input image.

3. The method of claim 1,
    wherein each latent code of the set of latent codes has a corresponding CLIP code.

4. The method of claim 3, wherein each latent code of the set of latent codes and its corresponding CLIP code is generated from an image of a set of images.

5. The method of claim 1, wherein the latent code generator module is further configured to generate the input image latent code based on the input image.

6. The method of claim 1, wherein the latent code blending module comprises a StyleGAN synthesis network and wherein the latent code generator module comprises a StyleGAN encoder.

7. The method of claim 1, wherein the initial latent code comprises a first set of layers, wherein the input image latent code comprises a second set of layers, wherein each layer of the first set of layers corresponds to a respective layer of the second set of layers, and wherein blending the initial latent code with the input image latent code comprises, blending each layer of the first set of layers with the corresponding respective layer of the second set of layers.

8. A system comprising:
    a request module configured to receive an input text, an input image, and a request for a blended image;
    a contrastive language-image pre-training ("CLIP") module configured to generate, for the input text, an input text CLIP code;
    an initial latent code selection module configured to select an initial latent code from among a set of latent codes, the selection based on the initial latent code having a corresponding CLIP code with a greatest semantic similarity to the input text CLIP code;
    a latent code blending module configured to generate a blended image latent code by blending the initial latent code with an input image latent code determined for the input image; and
    a latent code generator module configured to generate the blended image from the blended image latent code,
    wherein the request module is further configured to transmit the blended image responsive to the request.

9. The system of claim 8, wherein the input text specifies target features for modifying the input image.

10. The system of claim 8,
    wherein each latent code of the set of latent codes has a corresponding CLIP code.

11. The system of claim 10, wherein each latent code of the set of latent codes and its corresponding CLIP code is generated from an image of a set of images.

12. The system of claim 8, wherein the latent code generator module is further configured to generate the input image latent code based on the input image.

13. The system of claim 8, wherein the latent code blending module comprises a StyleGAN synthesis network and wherein the latent code generator module comprises a StyleGAN encoder.

14. The system of claim 8, wherein the initial latent code comprises a first set of scales, wherein the input image latent code comprises a second set of scales, wherein each scale of the first set of scales corresponds to a respective scale of the second set of scales, and wherein blending the initial latent code with the input image latent code comprises, blending each scale of the first set of scales with the corresponding respective scale of the second set of scales.

15. A non-transitory computer-readable medium storing executable instructions, which when executed by a processing device, cause the processing device to perform operations comprising:
    receiving an input image, an input text, and a request for a blended image, wherein the input text specifies target features for modifying the input image;
    generating the blended image by applying an image modification model to an input image and the input text, wherein the image modification model comprises:
        a contrastive language-image pre-training ("CLIP") model configured to generate, for the input text, an input text CLIP code;
        an initial latent code selection model configured to select an initial latent code from among a set of latent codes, the selection based on the initial latent code having a corresponding CLIP code with a greatest semantic similarity to the input text CLIP code;
        a latent code blending model configured to generate a blended image latent code by blending the initial latent code with an input image latent code determined for the input image; and
        a latent code generator model configured to generate the blended image from the blended image latent code; and
    transmitting, responsive to the request, the blended image.

16. The non-transitory computer-readable medium of claim 15,
    wherein each latent code of the set of latent codes has a corresponding CLIP code.

17. The non-transitory computer-readable medium of claim 16, wherein each latent code of the set of latent codes has a corresponding CLIP code.

18. The non-transitory computer-readable medium of claim 15, wherein the latent code generator model is further configured to generate the input image latent code based on the input image.

19. The non-transitory computer-readable medium of claim 15, wherein the latent code blending model comprises a StyleGAN synthesis network and wherein the latent code generator model comprises a StyleGAN encoder.

20. The non-transitory computer-readable medium of claim 15, wherein the initial latent code comprises a first set of layers, wherein the input image latent code comprises a second set of layers, wherein each layer of the first set of layers corresponds to a respective layer of the second set of layers, and wherein blending the initial latent code with the input image latent code comprises, blending, each layer of the first set of layers with the corresponding respective layer of the second set of layers.

* * * * *